Aug. 9, 1932.  J. C. WILLIAMS  1,870,701
PROCESS AND MACHINE FOR MAKING KNITTED FABRICS
Filed Jan. 31, 1929  7 Sheets-Sheet 1

Fig. 1.

INVENTOR
JAMES C. WILLIAMS
by his attorneys
Howson and Howson

Aug. 9, 1932. J. C. WILLIAMS 1,870,701
PROCESS AND MACHINE FOR MAKING KNITTED FABRICS
Filed Jan. 31, 1929 7 Sheets-Sheet 3

WIDENED SEGMENT

NARROWED SEGMENT

Fig.10.

INVENTOR
JAMES C. WILLIAMS
by his attorneys
Howson and Howson

Aug. 9, 1932.　　J. C. WILLIAMS　　1,870,701
PROCESS AND MACHINE FOR MAKING KNITTED FABRICS
Filed Jan. 31, 1929　　7 Sheets-Sheet 5

INVENTOR
JAMES C. WILLIAMS
by his attorneys
Howson and Howson

INVENTOR
JAMES C. WILLIAMS
by his attorneys
Howson and Howson

Patented Aug. 9, 1932

1,870,701

UNITED STATES PATENT OFFICE

JAMES C. WILLIAMS, OF DALTON, GEORGIA, ASSIGNOR TO WESTCOTT HOSIERY MILLS, OF DALTON, GEORGIA, A CORPORATION OF GEORGIA

PROCESS AND MACHINE FOR MAKING KNITTED FABRICS

Application filed January 31, 1929. Serial No. 336,448.

This invention relates to knitted fabrics and process and machine for making same and more particularly to fabrics containing tapered segments such as are found in the toe pockets of seamless hosiery and to the process and machine for knitting same.

One object of the invention is the production of a variety of shapes of tapered segments in seamless hosiery. Another object is to produce, in a more rapid and satisfactory manner, a widened toe segment having a plurality of angles between the diagonal suture of the toe and the upper edge of the segment, such as forms the subject matter of my U. S. Patent 1,669,591, dated May 15th, 1928. Still another object of the invention is to produce a stocking which can be knit more economically, and which at the same time will fit and wear better, than those heretofore made.

In making tapered segments in fabrics by means of reciprocating knitting with a partial course of needles and gradually increasing the number of needles in action—a process which is used in making the widened segment of the ordinary seamless toe pocket—it has been customary for a number of years to manipulate the needles in accordance with the so-called "two down one up" method. According to this method the next to the last needle to knit on any swing or oscillation in one direction is the first needle to knit on the next or return movement of the needles through the knitting cams. This is accomplished by allowing the lifting pick—on the return movement—to raise the leading needle out of action before that needle reaches the knitting cams. The number of active needles is increased one needle at each oscillation by letting the lowering picker or dropper draw two needles down into action at the rear end of the active segment. This lowering of two needles into action at the rear end occurs before the needles have passed through the knitting cams and therefore the active segment will be two needles longer at one end and one needle shorter at the other than during the previous passage through the knitting cams.

According to my invention the needles can be brought into action more rapidly by novel widening picker mechanism, in a manner which results in fewer "seconds", and more rapid production than heretofore and which permits the making of a more varied and satisfactory structure. According to this invention the active segment of needles can be increased at a varied rate while always using as the leading needle the needle adjacent the last one to knit on the previous oscillation.

My invention will be shown and described as if embodied in the well known Scott & Williams type of revolving needle cylinder circular knitting machine such as shown in the patent to Robert W. Scott, Number 1,152,850, dated September 7, 1915 and the patent to A. E. Page, 1,611,688, dated December 21, 1926.

In the drawings:

Figs. 2, 3, 4 and 5 are views of the end of the new widening picker in various operative positions; Fig. 2 showing the picker in its uppermost position ready to lower three needles; Fig. 3 showing the picker after it has been lowered by the needles from the position of Fig. 2; Fig. 4 showing the picker in its intermediate operative position adapted to lower two needles only; and Fig. 5 showing the picker after it has been lowered from the position of Fig. 4;

Fig. 6 is a detail end view of the main pattern drum showing the cams for controlling the widening picker;

Fig. 7 is a detail end view of a segment of the main pattern drum showing a modified series of cams for controlling the widening picker;

Fig. 8 is a perspective view of the new widening picker;

Fig. 9 is an outline of the toe of the stocking shown in greater detail in Fig. 1;

Figs. 17, 18 and 19 are views in side elevation of the main pattern drum showing the picker controlling lever and picker latch bar in various positions; while

When knitting tapered segments in stockings by reciprocating knitting it is frequently desirable to increase the number of active needles more rapidly than is usually the case, and I have devised a process and apparatus which achieves this aim without any of the disadvantages normally to be expected. Specifically, in order to be able to increase the number of active needles more rapidly at the first part of a tapered segment and increase them more slowly in subsequent parts of the segment I have provided means whereby the needles can be brought into action at a net rate of two while knitting the first part of the segment and at a net rate of one while finishing the segment. This I accomplish for example, by picking three needles down and one up in the first part of the segment and two needles down and one up in the latter part of the segment, as will be described in detail hereinafter. The stocking which I obtain by these means is a simple uniform structure having no excess floated portions of yarn at the suture and no irregularities in appearance.

Figures 12, 13:
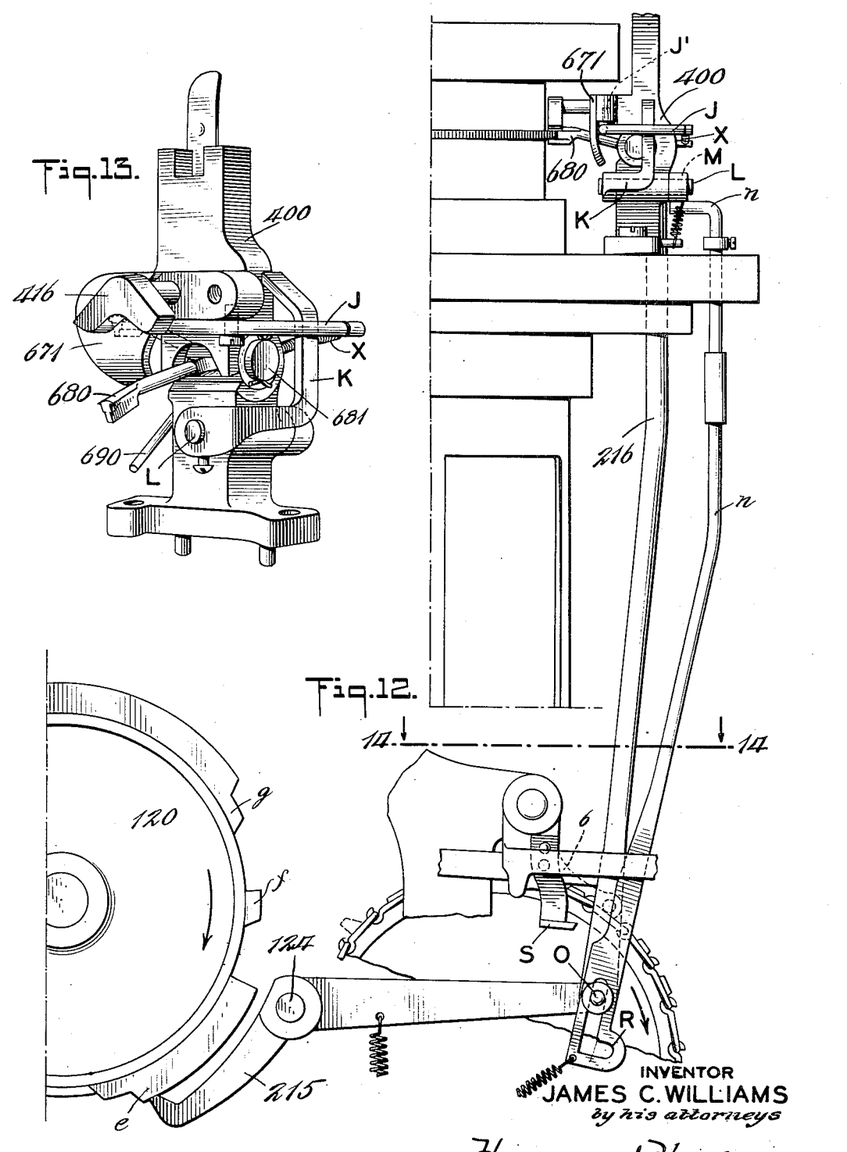
Fig. 12 is a view of the mechanism of my invention as seen from the right side of a Scott & Williams circular hosiery knitting machine.
Fig. 13 is a perspective view of the picker stand as seen from the middle of the machine, showing the new widening picker and picker positioning lever, with one picker wing cam 688 removed to give a better view.

The widening picker on Scott and Williams machines is moved into and out of operative position through instrumentalities controlled from the main pattern drum such, for instance, as shown in the patents to A. E. Page No. 1,611,668 and the patent to R. W. Scott No. 1,152,850 referred to above. This lowering i. e. widening picker is moved vertically in going from inoperative position (in which position the picker is held down below the level of the butts of the inactive needles) to operative position, (in which position the picker is spring biased up into the plane of the inactive needle butts). Heretofore upon the first oscillation of the needle cylinder, after the widening picker comes up into operative position, the first two of the inactive needle series butts engaged the lip of the picker and moved it sideways against a pick wing cam 671 having downward sloping edges (Fig. 13). Thus the picker is compelled to move in a path slanting downwardly similar to that shown in Figs. 2 to 5. This movement of the picker carries the two needles engaged under the lip down into action, i. e. brings their butts to the level of the active needle butts.

Figures 2, 3:
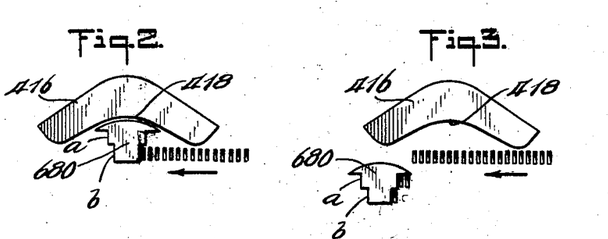
Figures 4, 5, 6, 7, 8, 9:
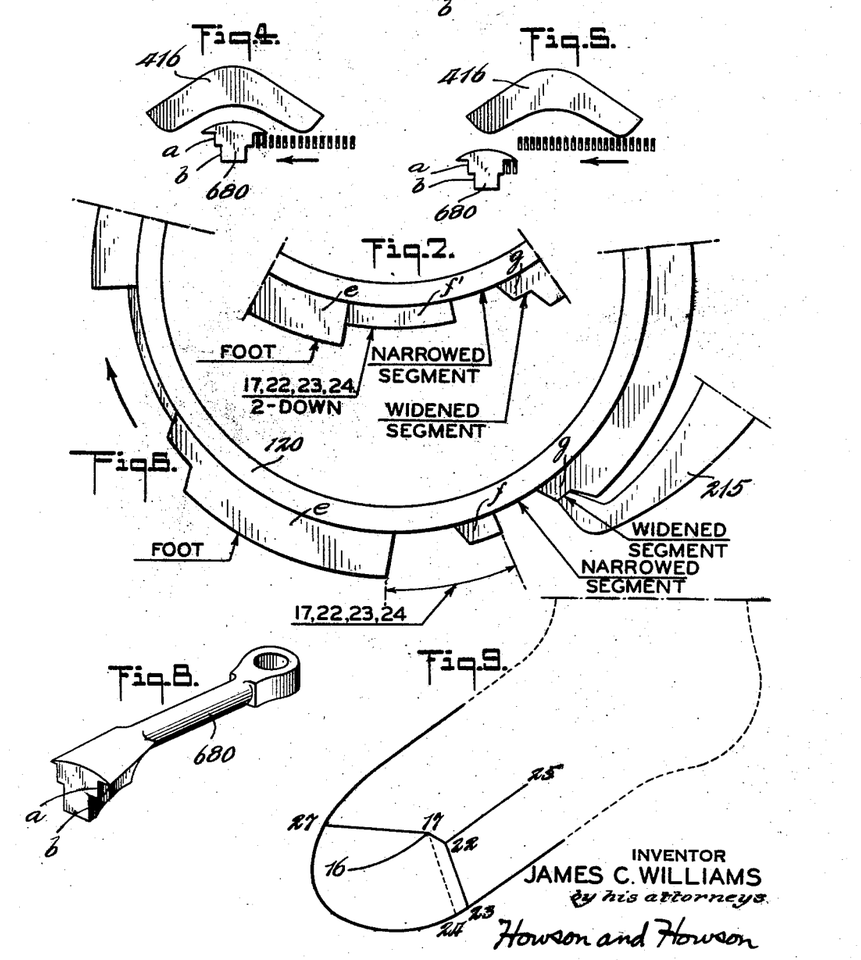

According to my invention the widening picker 680 has two needle-engaging lips $a$ and $b$ one below the other on each side of its operative end, the overhang of the upper lip $a$ being wide enough to engage two needle butts at a time and the lower lip $b$ being wide enough to engage one needle butt at a time (Figs. 3 and 8). This widening picker is pivotally mounted on a picker post 400, as usual, with its operative end in a recess 418 under the usual needle levelling or guide cam 416. The new two-lipped picker in addition to the lower or inoperative position and upper or operative position has a middle position in which it is operative. When the picker is in the uppermost position it will pick down three needles at a time, while when it is in the middle position it will pick only two needles down at a time. The elevation of the new lowering picker is determined in part by main pattern drum 120 and cams $e$, $f$, $g$, thereon as a lever 215 passes over them, and in part by the mechanism controlled by the pattern chain, as shown in Figs. 12–20.

When the picker is operative it is normally held in the middle position by a picker-positioning lever J which is formed of a rod bent into a right angle and pivoted on an inner corner J' of the down pick post 400. One arm of this lever normally engages the shank of the picker from behind and above by virtue of the action of a biasing spring X pulling on the other arm of the lever J and against the spring 688 tending to raise the picker. The picker is thus held down in the middle position.

When it is desired, to lower three needles at once, the lever J is rotated about the corner J' by mechanism presently to be described, against the action of spring X, to allow the picker to assume its uppermost position under the usual needle levelling cam 416 as shown in Fig. 2. When the picker is allowed to take this uppermost position, at each oscillation of the needle cylinder the leading needle butt approaching the picker with its companions as shown in Fig. 2, will be pushed against the lower lip $b$ of the picker and cause the picker to move sideways and down as in Fig. 3. At the same time the two needles next to the leading needle are caught under the upper lip of the picker $a$, the leading three needles thus being taken down to a level where they will thereafter be acted on by the regular stitch cams.

The mechanism for allowing the widening picker to rise to its upper operative position and pick down three needles at a time or to confine it to its lower operative position is carried by the stitch cam lever 215 and tripped by the pattern chain. Journalled horizontally in the base of the picker post 400 in a direction radial to the head of the machine is a short shaft L carrying on its inner end a bent arm K whose free end is bent upward and touches the picker-positioning lever J on the inside. The outer end of the shaft L has a connection to the switch cam lever 215 consisting of an arm M on the shaft L overlying a bent upper end of a substantially vertical latch bar or rod $n$. This rod $n$ is so connected to the switch cam lever 215 that it does not interfere with the usual functions of the gravity rod 216 and the switch cam and widening picker controlled thereby. In this way the lever 215 also serves as a picker-controlling lever. The rod $n$ is flattened out at its lower end and contains a right angle slot R in which a pin O on the end of the switch cam lever 215 moves freely. The vertical leg of the slot is long enough to permit the switch cam lever to move the gravity rod to its highest or lowest position without the pin O coming in contact with an end of the slot leg. The horizontal leg of the slot faces outward and there is a spring Z fastened between the lower end of the rod R and the frame of the machine, adapted to pull the lower end of the rod inwardly and hold the pin in the horizontal leg of the slot.

Figure 15:
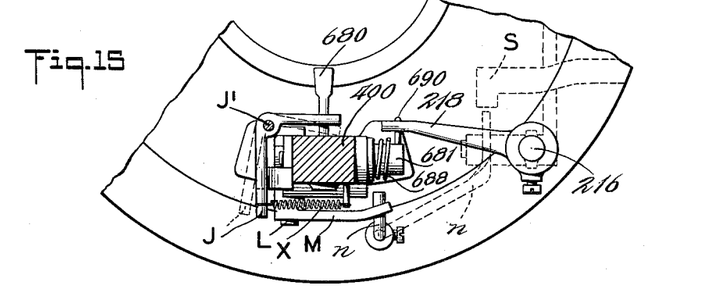
Fig. 15 is a plan view taken on the line 15—15 of Fig. 16, of that portion of the picker operating mechanism which lies above the bed plate of the machine.
Figure 16:
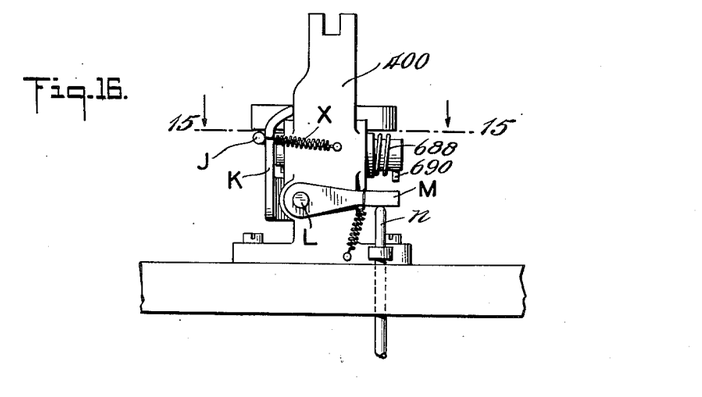
Fig. 16 is a view of the widening picker post, taken from the front of the machine.
Figure 17:
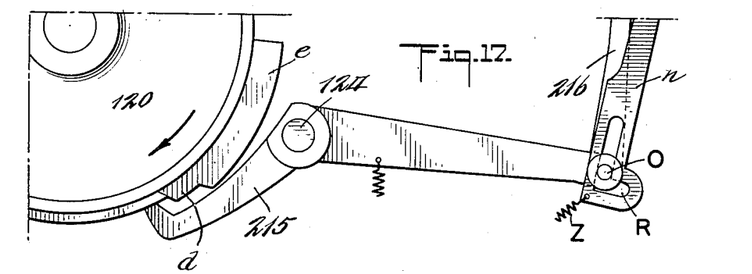
Figure 18:
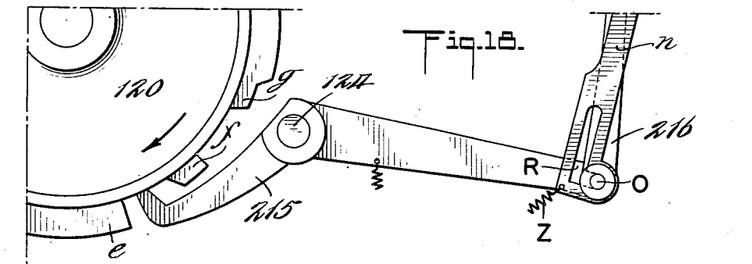
Figure 19:
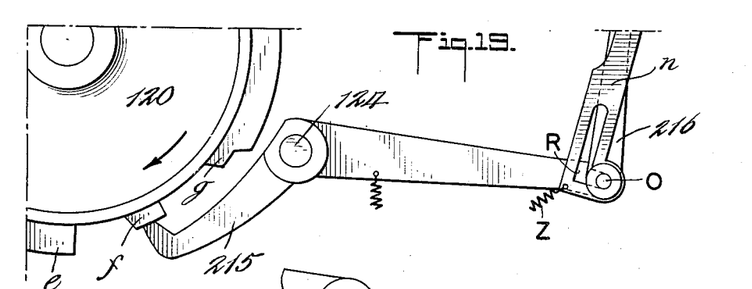

The cams on the main pattern drum 120 control the widening picker by means of the switch cam controlling lever 215, vertical gravity rod 216, picker finger 218 and pin 690 on the short shaft 681 of the widening picker 680. (Fig. 15). The finger 218 overlies the pin 690 and is so adjusted that when the switch cam lever 215 is resting on the surface of the main pattern drum 120, the widening picker 680 will be pulled down to its inoperative position. When the switch cam lever 215 is resting on a drum cam of medium height, such as $f$ or $g$, the finger 218 releases its pressure on the pin 690 and allows the widening picker to move up into whichever operative position is permitted by the picker-positioning lever J. The raising of the gravity rod which occurs when the switch cam lever 215 rides on to a high drum cam, such as $e$, does not affect the widening picker, the finger 218 merely rising out of contact with the pin 690.

The cams on the main pattern drum shown in Fig. 6 are arranged in a manner which brings the high cam $e$ under the switch cam lever 215 during the knitting of the foot of the stocking. The cams in this figure are arranged to permit the manufacture of the extended toe segment 17, 22, 23, 24, shown in Fig. 9 according to my novel, three down and one up process. In order to locate the picker at its upper operative position, shown in Fig. 2, it is necessary that the pin O be located in the horizontal leg of the right angle slot R and that the gravity rod be raised from its lowermost position to draw the picker-positioning lever J away from the operative end of the widening picker 680. For this purpose the cams on the main pattern drum are adjusted in such manner that upon the usual rack of the pattern drum at the completion of the foot the switch cam lever 215 will ride off the high cam $e$ down on to the surface of the drum and immediately during that same rack up on to the medium height cam $f$. The dropping of the switch cam lever 215 down on to the surface of the main pattern drum permits the spring Z to move the rod $n$ rearwardly until the pin O lies in the horizontal leg of the slot R. The movement of the cam $f$ under the switch cam lever 215 performs the double function, first of raising the picker finger 218 thus allowing the picker to rise under the action of spring 688, until it strikes the picker-positioning lever J, and second raising the rod $n$ which causes that lever J to be rotated clockwise out of engagement with the picker thus allowing the picker to rise further under the action of spring 688 to the position shown in Fig. 2. If it is desired to form the toe segment 17, 22, 23, 24 by means of the ordinary two down and one up picking the drum cam set-up shown in Fig. 7 may be used. In this figure the medium height cam $f$ is replaced by a cam $f'$ of the same height as $f$ which connects with the high cam $e$ and is long enough to underlie the lever 215 throughout the rack made at the end of the foot. By thus preventing the lever 215 from dropping to the surface of the drum 120 the pin O at the outer end of that lever 215 will not be moved far enough down the vertical leg of the slot R to get into the horizontal leg and the picker-positioning lever J will, therefore, hold the picker 680 in its lower operative position shown in Fig. 4.

When the extended toe segment 17, 22, 23, 27 is completed the drum is racked again and the picker controlling lever 215 will ride off cam $f$ or cam $f'$ and to the surface of the pattern drum. If cam $f$ and three down one up picking was used in the extended toe segment the pin O remains engaged in the horizontal leg of the slot R; but if cam $f'$ and "two down one up" picking was used then pin O will now become engaged in the horizontal leg of slot R. While picker-controlling lever 215 is resting on the drum the narrowing operation in the toe is performed. To start the widening operation in the toe, another rack of the drum rides the picker controlling lever upon cam $g$ and raises rod $n$. The raising of rod $n$ acts as previously described, permitting the picker to take its uppermost position as shown in Fig. 2, and thus take down three needles at one time. The machine is now knitting the widened segment 17, 16, 27.

If it is desired to have a plurality of angles in this widened toe segment between the diagonal suture of the toe and the upper edge of the segment, the widening picker 680 may be moved from one operating position to another during the knitting of the segment. Thus, if after knitting part of the segment three down and one up, it is desired to knit the remainder two down and one up, the rod $n$, may be tripped by the pattern chain by mechanism which will now be described.

Figure 14:
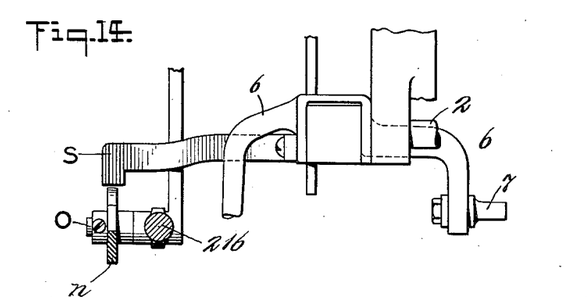
Fig. 14 is a fragmentary plan view taken on the line 14—14 of Fig. 12 showing the kick off bar in detail and its relation to the fashion marks bracket.
Figure 20:
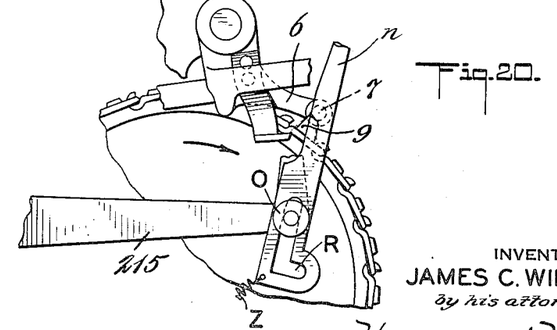
Fig. 20 is a fragmentary detail view of the latch bar tripping mechanism showing the relation between the latch bar and the pattern chain.

Overlying one side of the pattern chain is a pin 7 carried in a bracket 6 pivotally mounted on a horizontal shaft 2 on the frame of the machine (Figs. 14 and 20). The bracket 6 carries a bent arm S whose laterally projecting end portion lies across to the rear edge of the rod $n$. The laterally projecting end portion of the bent bar S is located below the shaft 2 on which the bracket 6 is pivoted and, therefore, when a lug 9 on the pattern chain raises the pin 7 the end portion of the bent bar S pushes the lower end of the rod $n$ radially outward against the action of the spring Z thus disengaging the pin O from the horizontal leg of the slot R and allowing the bar $n$ to drop of its own weight. The dropping of the bar $n$ pivots the arm M and the bent arm K on the shaft L, permitting the spring X to push the controlling end of the lever J radially inward toward the operative end of the picker and thus depress it to its lower operative position. By the mechanism just described the net number of needles drawn down into action at each oscillation is changed from two to one.

This makes it possible to vary the angle in the widened segment of the toe—or any other widened segment—without disturbing the up or raising pick of the machine. I have found that this method of varying the net number of needles thrown into action while knitting a widened segment is preferable to the method of picking down a uniform number of needles and throwing the up picks into and out of action. It should further be noted that by means of the combination which I have described the net number of needles thrown into action on each oscillation can be changed by a mere change in level of one picker without disturbing the up pickers in any way. It should further be noted that the mechanism just described does not interfere in any way or prevent the normal functioning of the usual gravity rod 216 and finger 218, to depress the lowering picker out of the operative position in which it rests during round and round knitting and during knitting of the ordinary narrowed segment.

Though the mechanism has been described as applied to widening a segment it is not confined to that operation but may be used in other operations—the character of the segment produced depending on the net number of needles moved from one level to another.

The widened segment whose manufacture has just been described is of the type shown in Fig. 2 of my prior Patent 1,669,591 above mentioned.

I shall now describe the details of the manipulation of the yarns in knitting this widened segment 17, 16, 27 of Fig. 9 of this application. In knitting this segment the machine commences its reciprocation at the outer end 16 of the diagonal suture 16, 17, the knitting progressing toward the inner end 17. Assuming that the narrowed segment has been knit by decreasing the number of needles by one at each oscillation of the needle cylinder the fabric will have the appearance of Fig. 10. In this figure the dotted line 16, 17 indicates the center line of the diagonal suture, the portion below the dotted line being the narrowed segment knit by taking one needle out of action on each oscillation. The outer end 16 of the diagonal suture is located just outside the diagram at the lower left hand corner and the inner end 17 at the upper right hand corner of the figure.

As the machine commences the widened segment of the toe the lever 215 rides onto cam $g$ as previously described and the operation is commenced with three down and one up picking as follows. As the butts of the active needles start to pass through the knitting cams the butt of the leading idle needle comes in contact with the widening picker 680 and the three leading needles are drawn down to operative position at the rear end of the active group of needles in the manner shown in Fig. 3 and the active segment thus enlarged passes through the stitch cams. The needle butt which was the last one in the active series on this oscillation is the leading needle at the start of the next oscillation. As it approaches the stitch cams on this reverse stroke it is met by the raising picker which elevates it to the idle level before it takes yarn. The first stitch knit on this oscillation therefore comes on the needle adjacent i. e., right in back of the last needle to knit on the previous oscillation, which needle also knit on the previous oscillation. In this way the first needle to knit has the benefit of the usual slack from the sinker ahead of it in knocking over its new loop and there is no danger of the stitch cutting. On the other hand, there are no float threads susceptible to wear, slack to catch in the needles, sinkers and other parts of the machine to spoil the appearance of the fabric which is found when it is attempted to use as the leading needle a needle more than one away from the last needle to knit on the previous oscillation.

Figure 10:
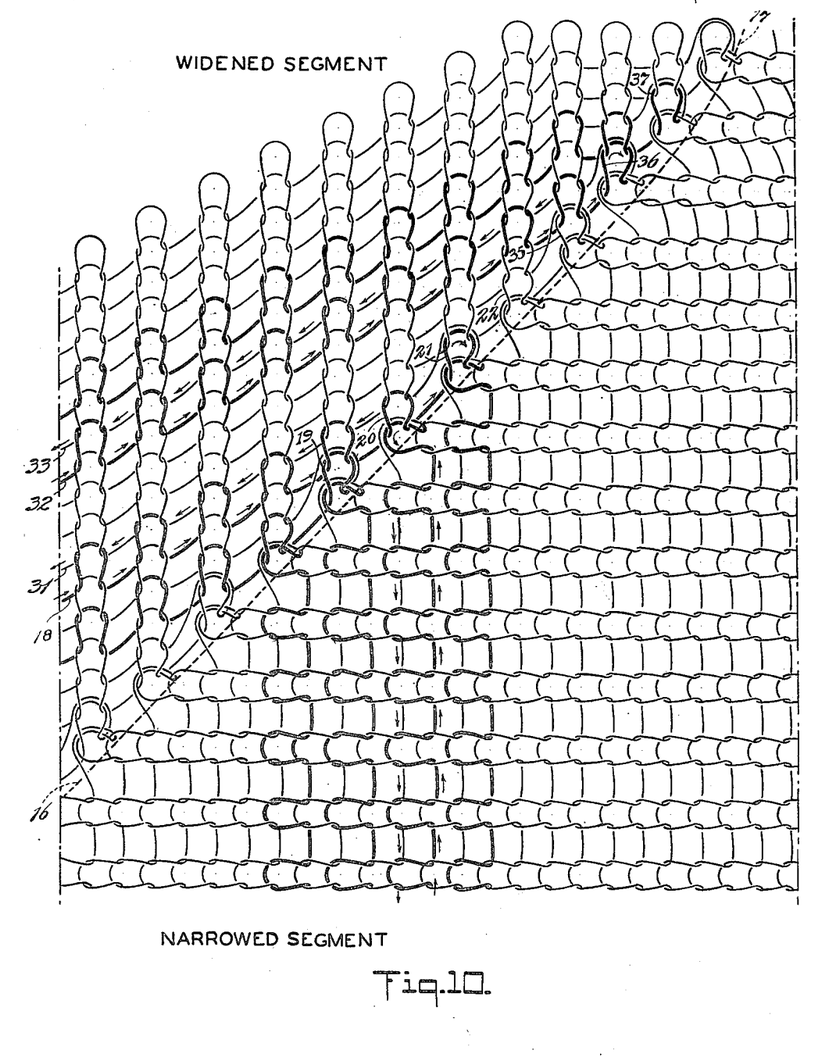
Fig. 10 is a diagram on a slightly larger scale than Fig. 1 of the stitches of the diagonal suture of Fig. 1; the inner end of the diagonal suture being at the upper right hand corner of the figure.

Let us assume for the moment that the course being knit is that numbered 18 on Figure 10 and that the knitting is progressing toward the right, i. e. toward the diagonal suture (as indicated by the small arrows). The needles corresponding to the stitches 19, 20, 21 are the three needles thrown down into action by the widening picker at the rear end of the active segment as the knitting of this course begins. The stitch just above 19 and also the stitches 20 and 21 themselves are therefore the last stitches knit in course 18. On the next oscillation the needle carrying stitch 21 starts off as the leading needle of the active segment but is thrown up out of action before it enters the knitting cams. On the next oscillation, i. e. the second after course 18, the three needles thrown down into action are those corresponding to the wales containing stitches 21, 22 and 35. As long as the widening picker is allowed to return at each oscillation to its upper operative position each successive oscillation in the same direction will have at the leading end of the active segment as it enters the knitting cams, two more needles than on the previous oscillation in the same direction. This increase occurs at one end of the active segment on the oscillation in one direction and at the other end of the active segment on the oscillation in the opposite or return direction. Assuming that the change to two down and one up picking is started at the course marked 32 on Figure 10, the knitting will progress as follows. As the course starts the needle carrying stitch 35 and the needle which is to knit stitch 36 are thrown down into action at the rear end of the active segment, and these two needles are the last to knit in this course. On the next oscillation the course 33 is made, the first stitch to be made being the second one above stitch 35 on the needle which knit 35 two courses before. The needle carrying stitch 36 is thrown up out of action by the up picker before it enters the knitting cams and therefore does not knit in course 33. This needle and the needle which is to knit stitch 37 are the two needles thrown down into action for the course after course 33. As long as the widening picker operates on each oscillation from the level shown in Fig. 4, every successive oscillation in the same direction will have a net gain of only one needle at the leading end of the segment as compared with the previous oscillation in the same direction. As in the case of three down and one up picking, there is a net gain being made at one end of the active segment on each oscillation.

My invention is peculiarly useful when making the tapered segment 17, 22, 24, Fig. 9 (and reference is here made to my Patent 1,621,343 dated March 15, 1927). I have observed that it is sometimes desirable to combine this tapered segment with a sole reinforcement which does not extend up to the median line on each side of the foot but ceases on a line 25, 22. In this case it is desirable that the lower end of the tapered portion shall end at the edge of the sole reinforcement as shown in Fig. 9. In order to bring the lower end of the tapered portion of the segment to this point it is sometimes desirable to introduce more courses in the tapered segment than can be conveniently accommodated on the line 17—22 and a pucker is formed. My invention does away with this pucker by reducing the number of courses in the tapered segment relatively to the number of needles in the tapered portion of the segment or, if desired, permitting the manufacturer to increase the number of needles in the tapered portion of the segment without increasing the number of courses in the segment. In this way the angle of the tapered portion of the segment is made more acute, producing a more pointed taper, the pucker at the lower end of the tapered portion is eliminated and the number of courses in the sole relatively to the number of courses in the instep can be kept unchanged.

Figure 11:
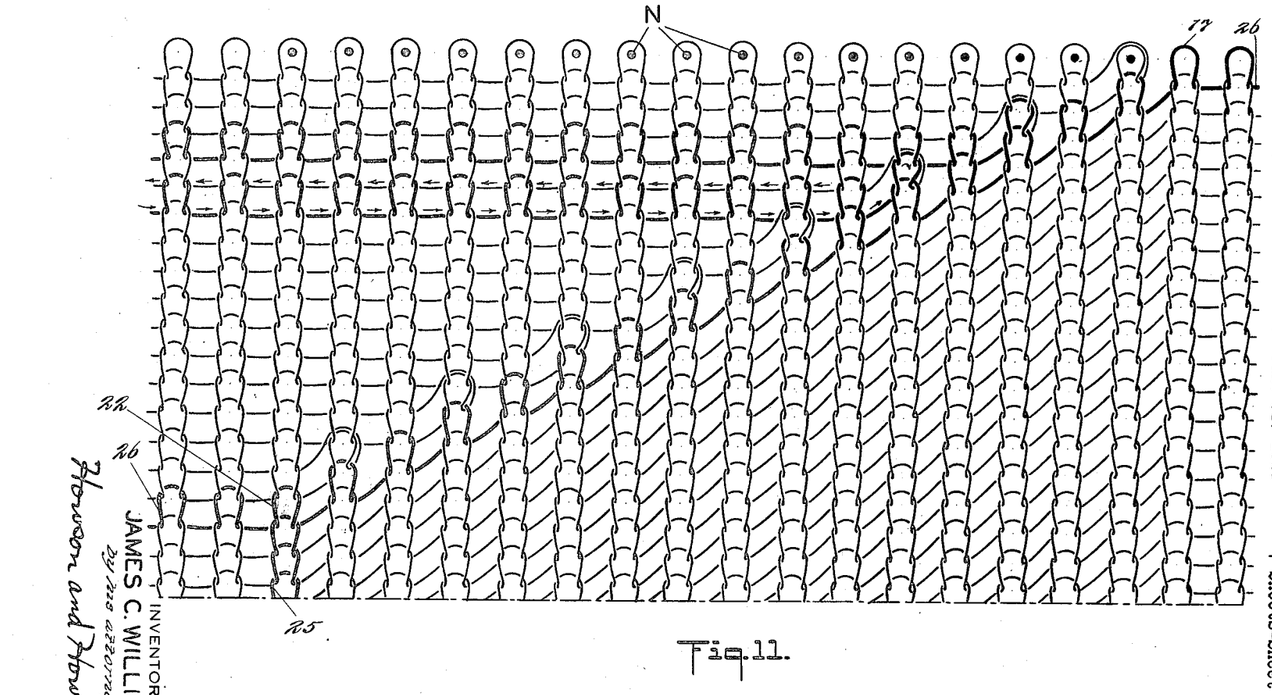
Fig. 11 is a diagram similar to Fig. 10, showing the upper end of the tapered segments 17, 22, 23, 24 of Fig. 9.

The structure of the tapered portion of such segment is shown in Fig. 11. The last course previous to commencing the tapered segment 17, 22, 23, 24 is indicated by the heavy course of yarn 26 (Fig. 11) but as in the case of Fig. 10 some of the alternate courses of the tapered segment are also shown with heavy lines to make it easier to read the drawings.

The needles N are indicated in the position which they would occupy at the completion of the tapered segment 17, 22, 23, 24 just previous to commencing the narrowed segment of the toe. In Fig. 11 the entire tapered portion of the segment is shown made by drawing three needles down and one up.

It will be noted that the loops at the edge of the tapered segment which pass through the loops of the adjacent fabric are each free of their neighbors and that the added stitches which were knit as the first stitch of the course are turned over or twisted while those made on newly added needles which were not the first in the segment are not twisted. It will be noted that the yarn in a course of the segment does not pass through or around any loop of the adjacent fabric more than once nor around two loops at once.

Figure 1:
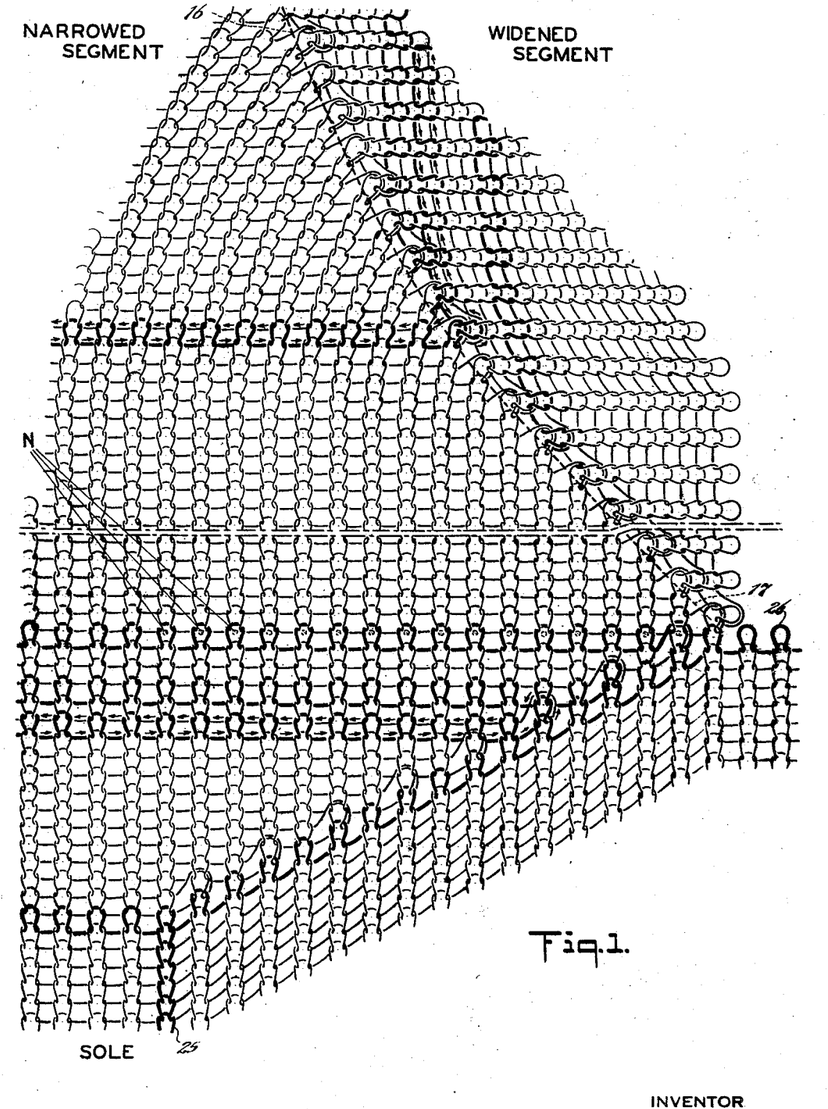
Fig. 1 is a large scale diagram of the stitches forming parts of the toe of a seamless stocking made according to my invention, the yarn in certain courses being shown in heavy lines to make the diagram more legible.

Figs. 1, 10 and 11 should be understood as merely diagrammatic, the exact angular relations having been changed slightly for the sake of clarity. Thus in Fig. 1 the angle between the course at the close of the tapered segment, which is shown containing the needles N, is at a slightly greater angle with the diagonal suture line 16—17 than is actually the case. It might further be noted that whereas the diagonal suture line 16—17 is shown bent in Figs. 1 and 9 the diagonal suture line may appear straight after the stocking is boarded and the upper edge 17—27 of the widened segment of the toe may appear bent.

It will be obvious that my invention may be used in knitting tapered segments of any kind on either straight or circular machines.

I claim:

1. In a process for making knitted fabrics the steps of reciprocating a series of needles with a group of said needles in idle position and a group in knitting position, lifting a needle or needles out of action and lowering a plurality of needles into action at opposite ends of the active group of needles at each oscillation and varying the number in the plurality of needles lowered into action at the end of the active group.

2. In a process for making knitted fabrics the steps of reciprocating a series of needles with a group of said needles in idle position simultaneously feeding yarn to said active group and a group in knitting position, and lowering three needles into action and lifting one needle out of action at opposite ends of the active group of needles at each oscillation.

3. In a process for making knitted fabrics, the steps of knitting reciprocatingly on part of the circle of needles of a circular knitting machine, the leading needle in each oscillation having knit on the previous movement in the opposite direction and having been adjacent to the last needle to knit on that previous oscillation, and adding a varying number of needles to the active segment at predetermined oscillations.

4. In a process for making knitted fabrics on a circular knitting machine, the steps of reciprocating a circle of needles with a group of said needles in idle position and a group in knitting position, lowering three needles into action and lifting one needle out of action at each oscillation and there after lowering two needles instead of three while continuing to reciprocate and to lift a single needle out of action at each oscillation.

5. In a process for making knitted fabrics, the steps of knitting reciprocatingly on part of the circle of needles of a circular knitting machine, the leading needle of each oscillation having knit and been adjacent to the last needle to knit on the previous oscillation and adding three needles to the active segment of needles at each oscillation.

6. A circular knitting machine having a widening picker adapted to move two needles in one stroke or more than two needles in one stroke, as desired, in combination with cam means controlling the movement of said picker whereby to control the number of needles moved.

7. A circular knitting machine having a widening picker with two needle engaging lips on each side of its operative end, in combination with cam controlled means adapted to hold one or the other lip in the path of the butts of the needles to be acted upon or to hold said picker out of the path of the idle needles.

8. A circular knitting machine having a widening picker, needle engaging lips at different levels on each side of the operative end of said picker, the lower lip being adapted to catch one needle and the upper lip two, in combination with cams and other controlling mechanism adapted to hold said picker with either the upper or lower lip in the path of the butts of the needles to be acted upon.

9. A knitting machine having a multi-lipped widening picker for moving the needles, a plurality of means, having different operating characteristics, co-operating to control said picker, said means being directly connected to other means operated by the pattern drum for controlling said plurality of means.

10. A knitting machine having a picker post and a multi-lipped widening picker mounted thereon for lowering knitting needles, means for raising needles, in combination with means, partially located on said post, for varying the net number of needles lowered.

11. A knitting machine having a needle cylinder holding needles, a picker post and a multi-lipped picker mounted thereon for lowering needles, means, partially located, on said post, for increasing or decreasing the number of needles lowered upon each oscillation of the needle cylinder by less than the whole number it is possible to lower upon one oscillation.

12. In a knitting machine having a pattern drum, a widening picker controlled from the pattern drum, and a pattern chain in combination with means controlled by said pattern chain adapted to vary the operative position of said picker while under the control of the pattern drum.

13. In a knitting machine having a picker for moving needles main pattern control means, auxiliary pattern control means, means controlling said picker from said main pattern control means, secondary means for controlling said picker from said main pattern control means, said secondary means being rendered operative by said auxiliary pattern control means.

14. In a knitting machine having a pattern chain and pattern drum, a picker capable of moving a variable number of needles at each stroke, means controlled from the pattern drum to vary the number of needles moved and means operated by said pattern chain to trip said means.

15. In a knitting machine, a widening picker adapted to take an inoperative and a plurality of operative positions, main pattern control means, means rendered operative by movement of said main pattern control means, for determining, from said main pattern control means, which of said positions, said picker is to take, in combination with means for rendering said determining means ineffective.

16. In a circular knitting machine a narrowing picker and a widening picker, said widening picker being adapted to move two needles or more than two needles at one time, as desired, operating mechanism for said pickers causing both said pickers to operate on a group of active needles during the same reciprocation.

17. In a circular knitting machine a narrowing picker and a widening picker, said widening picker being movable to a plurality of elevations to catch two needles or more than two needles as desired, pattern mechanism, and operating mechanism controlled from the pattern mechanism, for causing both said pickers to operate on a group of active needles during the same reciprocation.

In testimony whereof I have signed my name to this specification.

JAMES C. WILLIAMS.